US006724723B1

(12) United States Patent
Hamami

(10) Patent No.: US 6,724,723 B1
(45) Date of Patent: Apr. 20, 2004

(54) METHOD OF PROVIDING A SIGNALING QUALIFICATION FUNCTION IN A CONNECTION ORIENTED NETWORK

(75) Inventor: Ilan Hamami, Tel Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/320,169

(22) Filed: May 26, 1999

(51) Int. Cl.[7] .................................................. H04J 12/28
(52) U.S. Cl. .................................. 370/230; 370/395.53
(58) Field of Search ................................. 370/230, 231, 370/235, 252, 254, 255, 256, 395.1, 397, 399, 395.2, 395.21, 395.51, 395.53, 409, 522, 373, 377, 384, 385, 265, 271; 709/220, 221, 223

(56) References Cited

U.S. PATENT DOCUMENTS

| | | | | |
|---|---|---|---|---|
| 5,062,108 A | * | 10/1991 | Bales et al. ................... | 370/467 |
| 5,258,979 A | * | 11/1993 | Oomuro et al. ............... | 370/232 |
| 5,483,536 A | | 1/1996 | Gunji et al. ................ | 370/85.14 |
| 5,550,818 A | | 8/1996 | Brackett et al. ............... | 370/60 |
| 5,566,014 A | | 10/1996 | Glance ......................... | 359/124 |
| 5,594,717 A | * | 1/1997 | Watanabe et al. ............ | 370/232 |
| 5,678,006 A | * | 10/1997 | Valizadeh et al. ........... | 709/220 |
| 5,684,988 A | * | 11/1997 | Pitchaikani et al. .......... | 370/401 |
| 6,286,038 B1 | * | 9/2001 | Reichmeyer et al. ........ | 709/220 |
| 6,304,549 B1 | * | 10/2001 | Srinivasan et al. ........... | 370/230 |
| 6,331,986 B1 | * | 12/2001 | Mitra et al. ................... | 370/232 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, AddisonWesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

*Primary Examiner*—Wellington Chin
*Assistant Examiner*—William Schultz
(74) *Attorney, Agent, or Firm*—Howard Zargtsky

(57) ABSTRACT

A method of providing a qualification function and associated action function to be performed for a connection request or a group of connection requests. The invention is applicable to situations wherein it is desirable for the network to perform a specific action before, during and/or after the establishment of a connection. The network is provided a mechanism whereby specific connection requests trigger the performance of one or more action functions. The network is operative to qualify connection requests wherein one or more action functions associated with those connection request(s) are triggered in response thereto. The qualifier, upon a connection meeting the criteria, passes a trigger to the specific action function that performs the desired specific action. More than one action may be specified, each action functioning to resolve an existing problem or perform a desired action. In addition, an information element can be included with the connection message indicating to the next hop network element along a connection path whether a particular action was preformed on the previous hop network element.

18 Claims, 5 Drawing Sheets

METHOD OF PROVIDING A SIGNALING QUALIFICATION FUNCTION IN A CONNECTION ORIENTED NETWORK

FIELD OF THE INVENTION

The present invention relates generally to data communications networks and more particularly relates to a method for establishing one or more qualification and associated triggered action functions on a specific connection in a connection oriented network such as an Asynchronous Transfer Mode (ATM) network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

SVC Connection Establishment

Networks that are connection oriented typically have two stages for connecting network users from point to point. The first stage in the establishment of the connection utilizes some form of signaling mechanism and in the second stage, data is transferred via the connection established in the first stage.

An example of such a connection oriented network is an ATM network. In the first stage, virtual connections are created using a complicated signaling/routing protocol such as Q.SAAL, Q.93, IISP, and/or PNNI between peer network nodes along the connection path to provide network users a service for establishing a connection to another network user. This connection is termed a Switched Virtual Circuit (SVC) and, once created, is used as the data path between the users that have been connected.

The connection originator uses the signaling protocol to convey the service details it is requesting the network to provide, e.g., destination address (the called address), class of service (CoS), traffic descriptor, protocol which is to used by the virtual connection, network transit, etc. In addition, the originator provides information about itself, in particular, its own address (the calling address).

Once the network receives the request from the originator user, it attempts to find a route to the destination that has sufficient resources to fulfill the specific characteristic requirements of the request as provided by the originating user. If the network finds a satisfactory route with the necessary resources to establish the connection, and if the called user also has sufficient resources to establish the connection, the connection is then established. Once the route is established, data can flow between source and destination over the connection.

Such a network may carry another type of connection known as a Permanent Virtual Circuit (PVC) which are typically established under manual management control. The service provided by PVCs and SVCs are the same, with the difference being their method of establishment.

The signaling/routing protocol used typically consumes a high percentage of computation resources in a node. This makes the connection establishment process slow. PVCs, as an alternative to SVCs, are set via management in a manual fashion on each network node along the path. The PVC connections are typically stored in system memory within the nodes making up the connection and are recreated in the event one or more portions of the connection fail. The connections are recreated and restored automatically, quickly and without the overhead of the signaling and routing protocol.

In the course of network operations, SVCs may be constantly created and torn down. SVC connections may be created very quickly and last for a relatively short lifetime duration, i.e., hundreds of milliseconds, seconds, etc., before being removed. In many networks today, however, SVCs serve to connect well known services located in the network to well known clients also connected to the network. These connections are utilized as permanent connections, as they are established and may not be taken down for days, weeks, and months. In many cases, SVCs are established on a permanent basis, whereby they are never taken down and remain up until a network failure occurs.

In many instances, it would be desirable for the network to take specific action before, during and/or after the establishment of a connection. Preferably, the specific action to be taken should be associated with a specific connection or connection requests. The network would have a mechanism by which a connection request or a group of connection requests can be qualified as the specific connection requests to act upon.

A block diagram illustrating the internal functional hierarchical processing layers in a typical prior art ATM switch is shown in FIG. 1. The example ATM switch, generally referenced 10, comprises an ATM Adaptation Layer Type 5 (AAL5) module 12 which is the protocol standard for supporting the transport of ATM traffic and signaling messages. This module functions to adapt the user traffic received from the PHY interface to the format of ATM cells. The signaling module 14 provides the signaling functionality for the switch. The connection control module 16 provides services for the establishment and removal of calls. Requests to establish and remove calls are processed by the call connection control module. The routing module 18 functions to execute the routing algorithm and associated protocols to route calls from the source to the destination.

What is lacking, however, is a means for providing a qualification function and associated one or more action functions. Currently, switches do not include any means by which connection requests can be screened for meeting certain specific criteria and performing action(s) for those connections that meet the criteria.

SUMMARY OF THE INVENTION

The present invention is a method of providing a qualification function and associated action function to be performed for a connection request or a group of connection requests. The invention is applicable to situations wherein it is desirable for the network to perform a specific action before, during and/or after the establishment of a connection. The network is provided a mechanism whereby specific connection requests trigger the performance of one or more action functions. The network is operative to qualify the connection request(s). One or more action functions associated with those connection request(s) are then triggered in response thereto.

The qualifier, upon a connection meeting the criteria passes a trigger to the specific action function that performs the desired specific action. Examples of actions include but are not limited to (1) blocking the specific connection request, (2) steering the specific connection request to another destination address, e.g., an alias destination address, (3) pausing a specific connection request, etc. Further, more than one action may be specified, each action functioning to resolve an existing problem or perform a desired action.

It is important to note that the actual action functions themselves are not the key feature of the present invention. The qualification function, in combination with an action function (regardless of what the specific action is) is, however, the key feature of the present invention. A key feature of the invention is the mechanism by which one or more connection requests are qualified and selected as connections to perform one or more action functions on. It is intended that the scope of the present invention encompass any and all possible action functions, whether or not they are explicitly indicated herein.

Applications of the qualification functions and consequent action functions of the present invention include but are not limited to (1) diagnostic purposes, (2) debugging purposes and (3) any other application where it is desired to perform an action based on meeting one or more qualification criteria.

There is provided in accordance with the present invention, in a connection oriented network, a method of providing a signaling qualification function on one or more network elements for Switched Virtual Circuits (SVCs) originating from an SVC originator, the method comprising the steps of configuring the network element with a qualification database containing one or more qualification functions, configuring the network element with an action database containing one or more action functions, comparing the qualification functions in the qualification database against the contents of a call connection request message, each positive comparison generating a match, performing an action associated with the qualification function corresponding to each match.

The step of comparing comprises the step of scanning each qualification function against qualification information within one or more information elements making up the connection request message. The qualification function comprises an information element ID, a byte offset and a byte size of the information element information; a qualification reference and a qualification operator; a pointer to an action; an action ID; a priority indication and a multilevel priority indication.

The step of configuring the network element with a qualification database and/or action database is performed by a network manager via a network management station via a MIB using the SNMP protocol.

The method further comprises the step of providing an information element to be included with the connection request message sent to a next hop network element, the information element providing an indication of whether a particular action was performed for that particular connection.

The method further comprises the step of performing an ordered set of actions whereby the same qualification function triggers different actions on different network elements along the call path, wherein a network element performs its assigned action only if a previous hop network element indicates that its assigned action was performed.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AAL | ATM Adaptation Layer |
| ANSI | American National Standards Institute |
| ATM | Asynchronous Transfer Mode |
| CCITT | Comite Consulatif International Telegraphique et Telephonique |
| CoS | Class of Service |
| FDDI | Fiber Distributed Data Interface |
| IE | Information Element |
| IISP | Interim Inter-Switch Signaling Protocol |
| ITU | International Telecommunications Union |
| LEC | LAN Emulation Client |
| MIB | Management Information Base |
| MPOA | Multiprotocol Over ATM |
| NE | Network Element |
| PDU | Protocol Data Unit |
| PNNI | Private Network to Network Interface |
| PVC | Permanent Virtual Circuit |
| QF | Qualification Function |
| SAAL | Signaling ATM Adaptation Layer |
| SNMP | Simple Network Management Protocol |
| SVC | Switched Virtual Circuit |
| UNI | User to Network Interface |

General Description

The present invention is a method of providing a qualification function and associated action function to be performed for a connection request or a group of connection requests. The invention is applicable to situations wherein it is desirable for the network to perform a specific action before, during and/or after the establishment of a connection. The network is provided a mechanism whereby specific connection requests trigger the occurrence of one or more action functions that perform some action on a corresponding connection. The network is operative to qualify the connection request(s) whereby one or more action functions associated with those connection request(s) are then triggered in response thereto.

The qualifier, upon a connection meeting the criteria passes a trigger to the specific action function that performs the desired specific action. Examples of actions include but are not limited to (1) blocking the specific connection request, (2) steering the specific connection request to another destination address, e.g., an alias destination address, (3) pausing a specific connection request, etc. Further, more than one action may be specified, each action functioning to resolve an existing problem or perform a desired action.

Note that the system of the present invention is applicable to any connection-oriented network that utilizes signaling to establish connections between network users. For illustration purposes, the present invention is described within the context of an ATM network. This, however, is not intended to limit the scope of the present invention.

Figure 1:
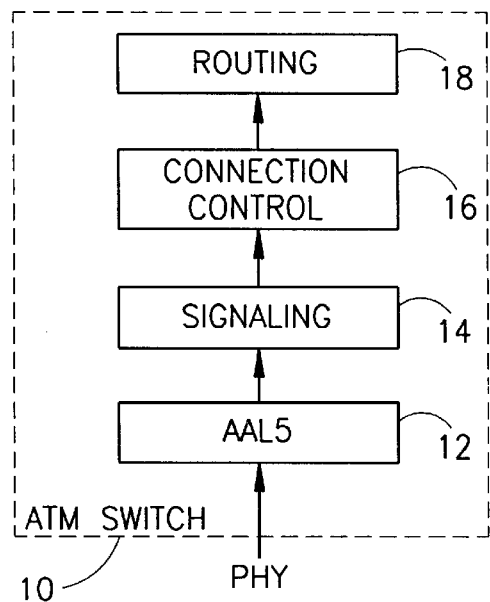
FIG. 1 is a block diagram illustrating the internal functional hierarchical processing layers in a typical prior art ATM switch.
Figure 2:
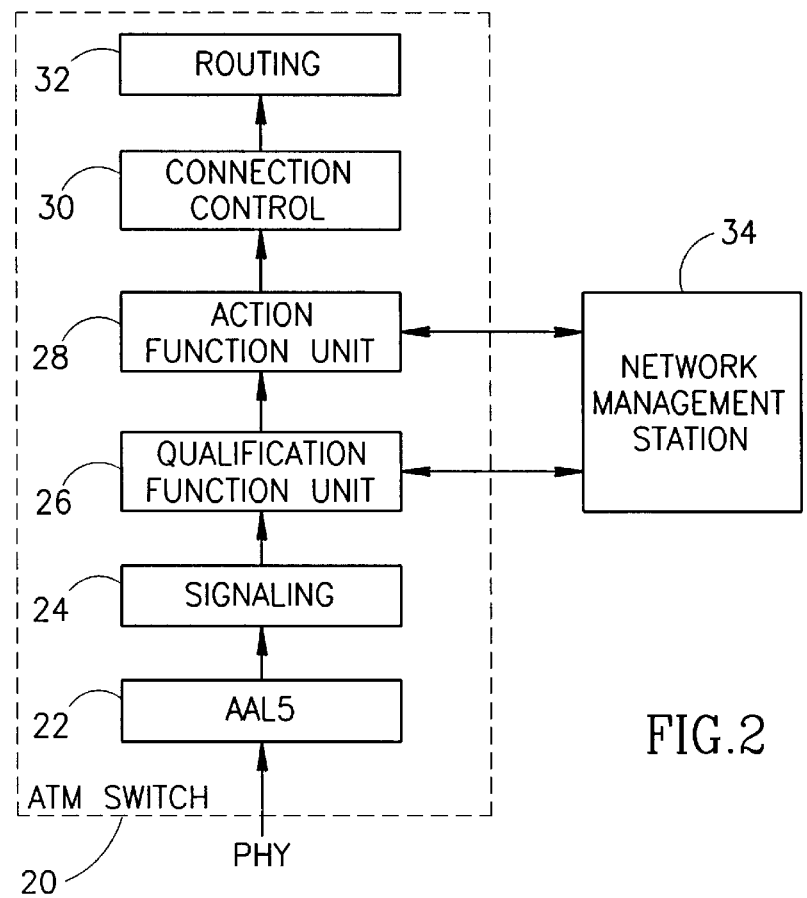
FIG. 2 is a block diagram illustrating the internal functional hierarchical processing layers in an ATM switch constructed in accordance with the present invention incorporating qualification and action function units.

A block diagram illustrating the internal functional hierarchical processing layers in an ATM switch constructed in accordance with the present invention incorporating qualification and action function units is shown in FIG. 2. The example ATM switch, generally referenced 10, comprises an ATM Adaptation Layer Type 5 (AAL5) module 22 which is the protocol standard for supporting the transport of ATM traffic and signaling messages. This module functions to adapt the user traffic received from the PHY interface to the format of ATM cells. The signaling module 24 provides the signaling functionality for the switch.

The output of the signaling module 24 is input to a qualification function unit 26. The qualification function unit performs the screening of connection requests to determine whether any meet the criteria configured previously by a network manager via the network management station 34. Any connections that do meet the criteria (also referred to as qualification functions) have their associated one or more actions performed by the action function unit 28.

The connection control module 30 provides services for the establishment and removal of calls. Requests to establish and remove calls are processed by the call connection control module. The routing module 32 functions to execute the routing algorithm and associated protocols to route calls from the source to the destination.

In accordance with the present invention, the qualification function unit 26 is configured with one or more qualifications, i.e., criteria, that the connection requests are compared against. The action function unit 28 comprises one or more actions that are performed when a qualification function match occurs. Both the qualification function unit and the action function unit are configured by an external source. Any suitable entity can be adapted to configure the two function units. In this example, the network manager via the network management station is adapted to configure the two function units.

Figure 3:
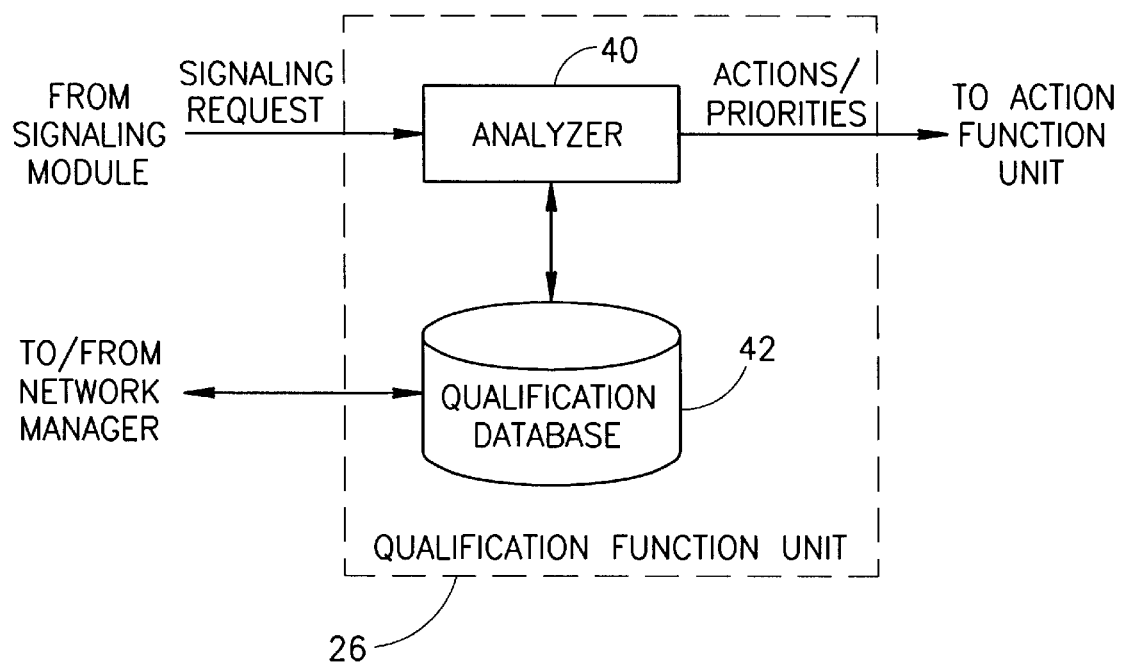
FIG. 3 is a block diagram illustrating the qualification function unit of the present invention in more detail.

A block diagram illustrating the qualification function unit of the present invention in more detail is shown in FIG. 3. In operation, the signaling requests from the signaling module 24 (FIG. 2) is input to the an analyzer 40 which is adapted to access a qualification database 42. As described previously, the network management station functions to read and write the qualification database 42 stored in the qualification function unit 26. The analyzer 40 is adapted to screen each connection request against the qualifications (criterias) stored in the qualification database 42. The actions and action priorities associated with those connections meeting the qualifications are output to the action function unit 28.

Figure 4:
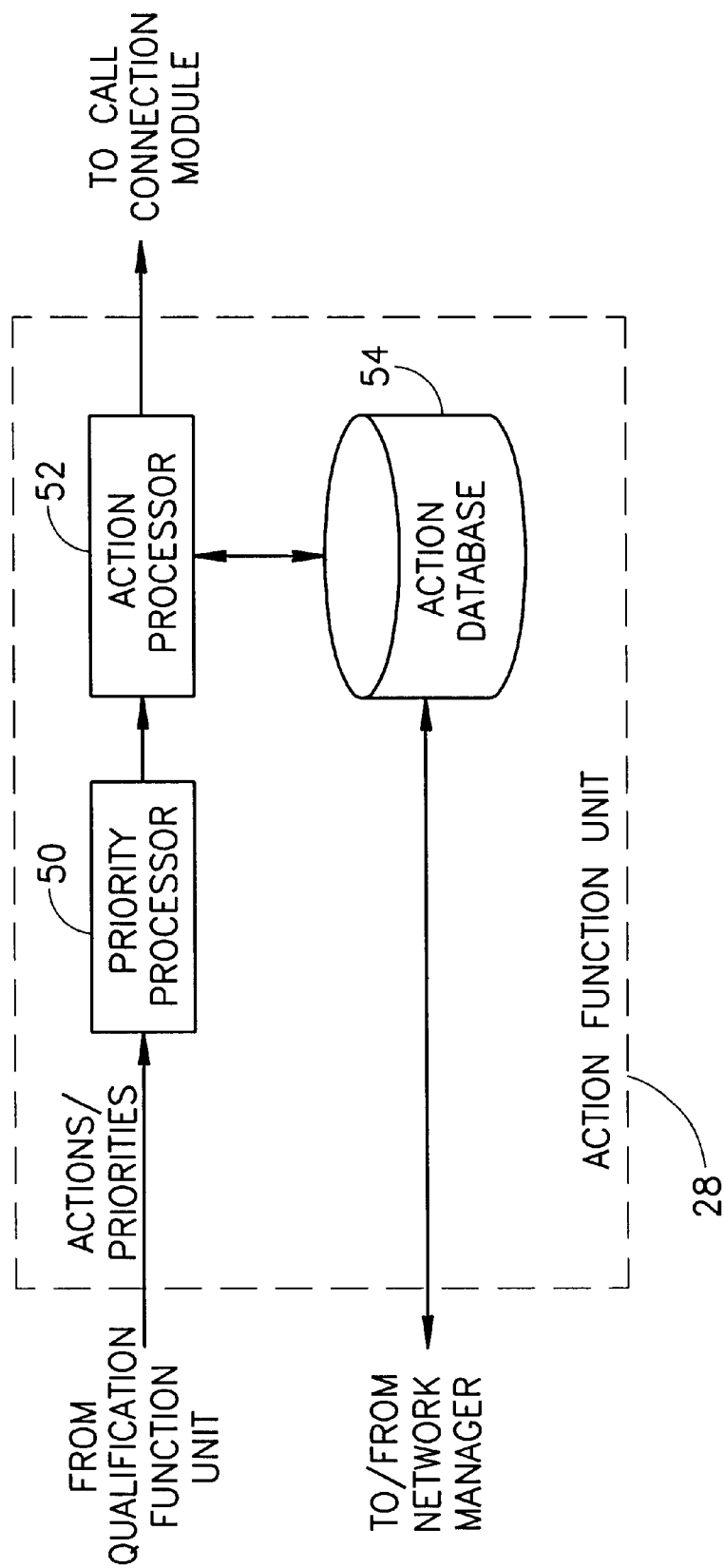
FIG. 4 is a block diagram illustrating the action function unit of the present invention in more detail.

A block diagram illustrating the action function unit of the present invention in more detail is shown in FIG. 4. The action function unit 28 comprises a priority processor 50, action processor 52 and action database 54. The action database 54 is adapted to be read and written to by the network management station. The action database holds all the possible actions that can be performed in the event a connection meets one or more qualification criteria.

In operation, actions and associated priorities are input to the priority processor 50 in the action function unit 28. The priority processor 50 is operative to analyze all the actions and their priorities and to determine the appropriate order of executing which actions before others. The priorities are action specific whereby certain actions must be performed before other actions. It is the function of the priority processor to sort out and analyze such dependencies and output an ordered list of actions. The ordered list of actions is input to the action processor 52 that performs the actual action. In performing the action, the action processor 52 may store and/or retrieve information stored in the action database.

In accordance with the present invention, each qualifier function in the qualification function unit 26 acts on the connection request which is represented by the signaling protocol. The signaling protocol comprises specific messages that are used in the establishment of connections. These messages include SETUP messages and ADD-PARTY messages, for example. These signaling messages are, in turn, comprised of one or more Information Elements (IEs) whereby each IE represents a specific request for service. Examples of information elements include but are not limited to (1) the destination address IE, i.e., the called address, (2) class of service (CoS) IE, (3) traffic descriptor IE, (4) virtual connection Layer 2/Layer 3 protocols IE, (5) network transit IE, etc.

Each information element comprises a known ID number as defined by the standard, e.g., the Q.93B standard (currently known as the Q.2931 standard), and can be detected and parsed from the connection request message and analyzed by the analyzer 40 in the qualification function unit 26 (FIG. 3). The qualification function can be configured to detect specific information within a specific information element and, in response thereto, to pass the message to the action function unit 28 upon the detection of the specific information. Some practical examples of specific information that can be screened for include but are not limited to the following:

1. All originating ATM addresses having a specific network prefix.
2. An originator having a specific ATM address.
3. All destinations having a specific ATM network prefix.
4. A specific ATM destination address.
5. All requests to transport a specific Layer 3 protocol.
6. All requests to transport a specific Layer 2 protocol.
7. All requests to transport a specific Protocol Data Unit (PDU), i.e., packet or payload, having a certain size, or is larger than a certain size or smaller than a certain size.
8. All requests for a specific Class of Service (CoS).
9. All requests for a specific bandwidth having a certain size, or is larger than a certain bandwidth or is smaller than a certain bandwidth.
10. All requests for the data to be transported via a specific transient network.

With reference to the tenth example in the list, networks can be identified as provided for in the standard. In some applications, a plurality of different networks may be intervening between a source and a destination end station. For example, each common carrier may have an established network that lies between the desired source and destination. In this case, the connection request may specify the transient networks that call should pass through.

The qualification analyzer 40 in the qualification function unit 26 (FIG. 3) is operative to scan each connection establishment request as it arrives to see whether the specific qualification information is present. The qualification information used in the analysis is retrieved from the qualification database that was previously configured by the network management station.

If the specific information is present, i.e., the qualification criteria has been met, then the request is passed to the action function unit 28. The invention provides for the ability to configure more than one qualification information, i.e., qualification function, and more than one action function.

A qualification and action database or table is generated and stored in each switch that supports the feature of the present invention. The tables are preferably stored in permanent memory within the switch. The qualification information stored in the permanent memory is used by the switch at a later time to compare the incoming connection request messages against the contents of the qualification database. The structure of the qualification information used to construct the qualification database of the switch is presented below in

TABLE 1

| | | | | Qualification Information Structure | | | | |
|---|---|---|---|---|---|---|---|---|
| Index | Information Element ID | Byte Offset | Byte Size | Qualification Reference | Qualification Operator | Pointer to Action | Major Priority | Minor Priority |
| 1 | | | | | | | | |
| 2 | | | | | | | | |
| . | | | | | | | | |
| . | | | | | | | | |
| . | | | | | | | | |
| N | | | | | | | | |

The qualification table is constructed from an entry index or function index, the Information Element ID, a byte offset, the relevant byte size (to compare during qualification analysis) within the Information Element data, the qualification reference itself, i.e., the value of the Information Element information, a qualification operator, a pointer to an action, a major priority and a minor priority.

The index can be generated by the switch itself or by the network management station. In either case, it functions as an index to an entry in the table. As described above, the Information Element ID is derived from the standard. The qualification operator is a mathematical operator, e.g., =, !=, <, >, ?, ?, etc. that is used to describe the qualification criteria in the comparison of the qualification reference to the data in the connection request message that is being screened. The pointer to the action comprises a single pointer. The pointer indicates which of the configured action functions should be executed as a result of a positive qualification function comparison. Note that a connection request message may have more than one action associated with it. If multiple actions correspond to a qualification, a separate entry is created for each action. Each additional action is placed in a separate entry resulting in one action per entry. In addition, individual priorities may be set among the actions associated with the same connection request message.

The qualification table also has provisions for a priority that may comprise any suitable priority scheme. In this example, a two level hierarchical priority is presented. A major priority comprising a level in the range 1 through 5, for example, where 1 is the highest priority and 5 is the lowest priority that can be specified for a particular qualification. A minor priority can also be specified which is on a different level that that of the major priority. The minor priority may also comprise a number in the range 1 through 5 with 1 being the highest priority and 5 being the lowest priority. One skilled in the art can implement any desired priority scheme and these are also contemplated to be within the scope of the present invention.

It is important to note that the priority can be used to (1) identify which action function to execute in the event more than one qualification function matches positive (this is assuming that only one action may be taken for a connection request message) and to (2) determine the order of multiple actions when more than one action is specified for the same qualification function, i.e., repeated entries with each entry differing in action only.

The priority processor 50 (FIG. 4) functions to analyze any and all conflicts among the various possible actions. For example, if the two actions of blocking a connection and steering a connection are the result of a qualification scan for a particular connection request message, the priority processor must decide which of the two to perform as they both cannot be performed, as it is not possible to block and steer a call at the same time. The priorities are user programmable allowing the user to place more weight on one action or the other. In the event blocking is more important, then the blocking action is performed and the steering action is not. On the other hand, if steering is deemed more important, then the call is steered and the blocking action is not performed.

An example is presented in connection with an action corresponding to the qualification listed above in item number 9. Suppose a network manager desires to know which users are consuming more than a certain bandwidth. A qualification function would be generated and configured in the qualification function unit to screen the connection request messages for those requesting greater than a specific bandwidth. The associated action would cause the ATM address and corresponding bandwidth request to be stored or forwarded to a network management station.

The network management station utilizes a suitably constructed MIB adapted to each network element to provide access to all the variables required to configure and read/write the qualification database and action database. The data is conveyed by the MIB using a suitable protocol such as SNMP. For example, the 'get-next' MIB command can be used to read the contents of both the qualification and action databases in a switch.

Note that every qualification function has an associated action. The action may be, however, to do nothing. In other words, the qualification function may be empty thus representing a pass through function that performs no action.

Figure 5:
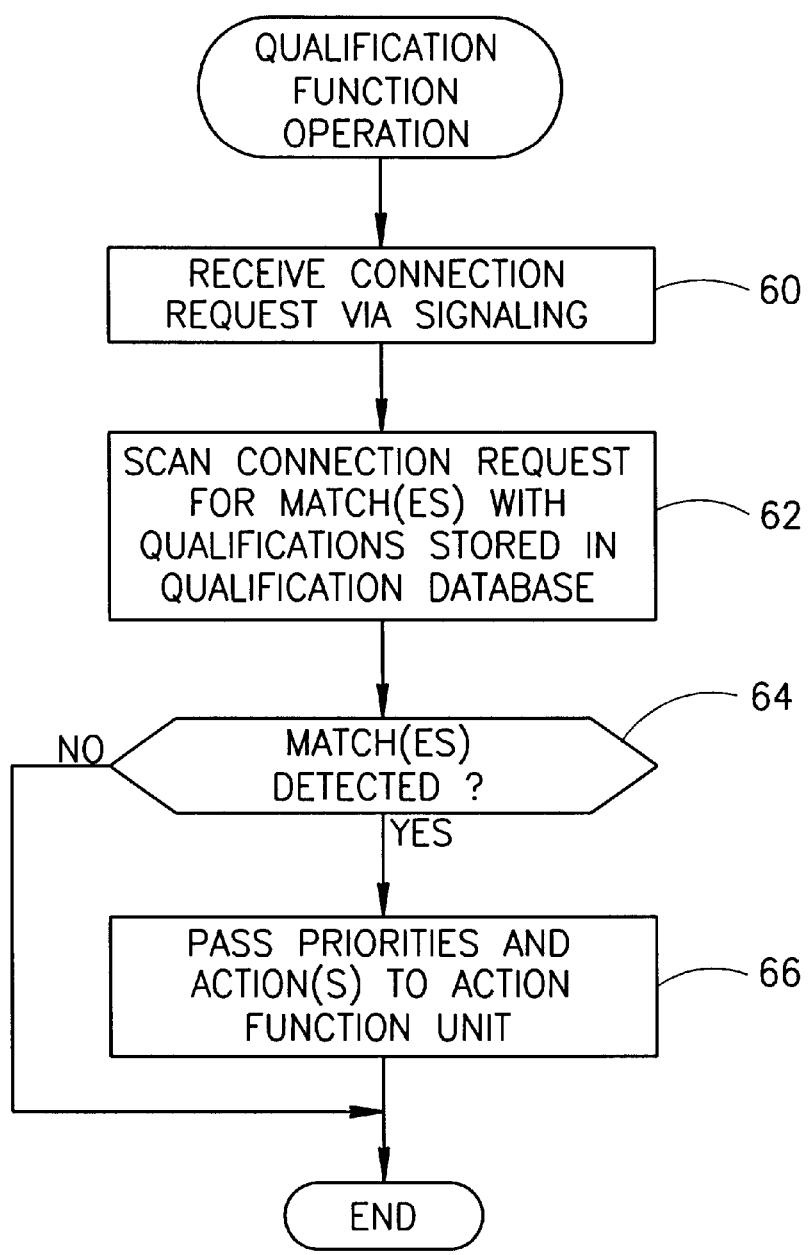
FIG. 5 is a flow diagram illustrating the qualification function operation portion of the present invention.

A flow diagram illustrating the qualification function operation portion of the present invention is shown in FIG. 5. On a switch which supports the feature of the present invention, the qualification database and action database are configured by the network manager via the network management station. The feature is triggered upon receipt via the signaling of a connection request message (step 60). The qualification functions stored in the qualification database are scanned and compared against the content of the connection request message (step 62). If no matches are found (step 64), processing proceeds as normal. If one or more matches are found (step 64), the associated priorities and action(s) are passed to the action function unit (step 66).

Optionally, an additional specific Information Element can be added to the connection request message upon the next hop in the routing path. This specific Information Element may be adapted to indicate the action that was taken in the previous node in response to the action associated with the qualification function. For example, if the action executed on the previous node was to ignore the request, then an indication of this can be added to the RELEASE message as a cause of the release. A network element can be configured whether to disclose, i.e., reveal, this information or not. For example, if a call matches a particular qualification function and the associated action is to block the call, a corresponding cause may indicate that the user's account is overdue.

Figure 6:
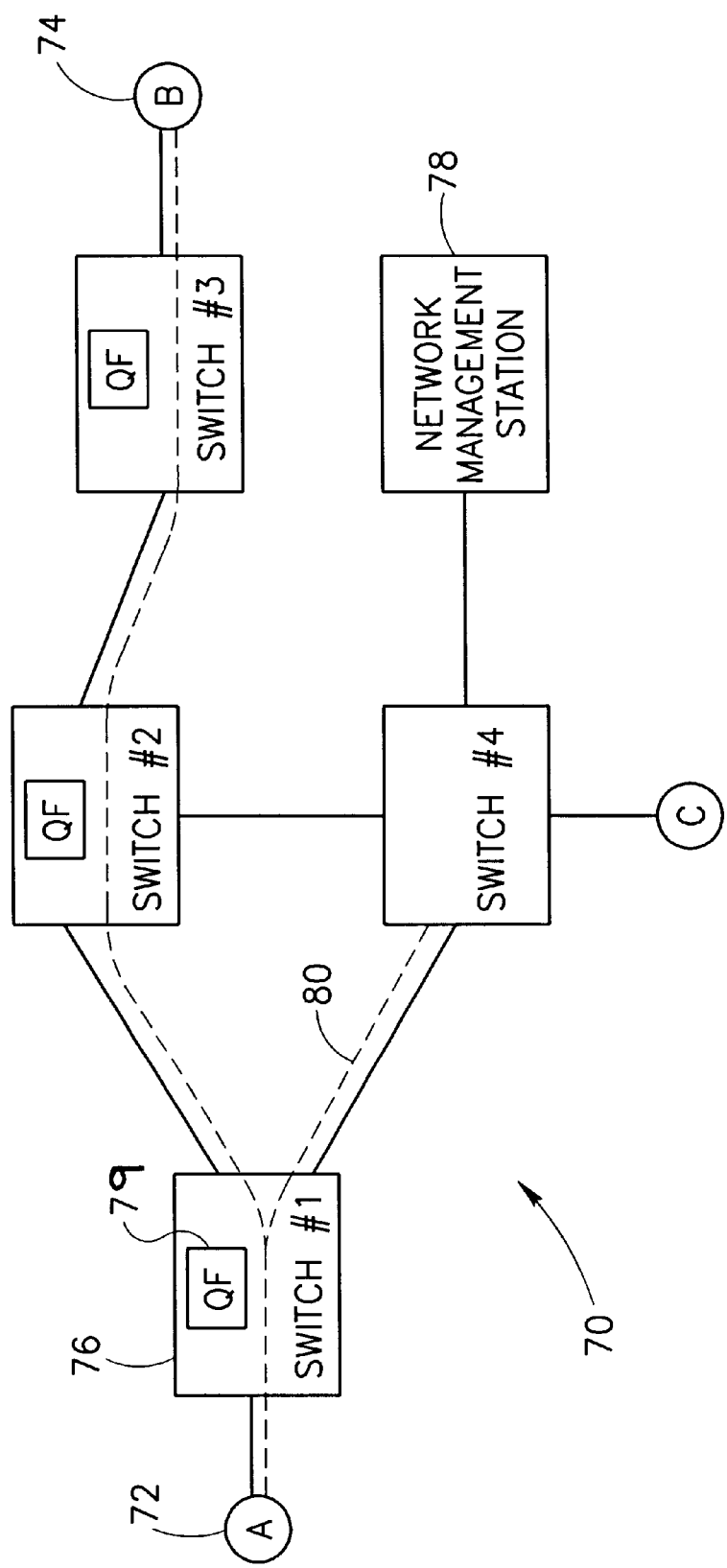
FIG. 6 is a network block flow diagram illustrating an application of the qualification function of the present invention to an example ATM network.

A network block flow diagram illustrating an application of the qualification function of the present invention to an example ATM network is shown in FIG. 6. The network, generally referenced 70, comprises an SVC originator 72, destination 74, several switches 76, labeled switch #1 through switch #4 and network management station 78. Switches #1, #2 and #3 are adapted to implement the feature of the present invention, thus they each comprise a qualification function module and action function module 79 (both modules are represented by the box labeled QF).

The SVC originator can be any network device that is capable of establishing SVCs, and may include, for example, an ATM end station, Ethernet based edge device, LEC, MPOA Client, etc. The SVC originator is operative to create one or more SVCs to the destination via any of the switches #1 through #4. The network management station comprises control means operative to configure the qualification database and action database in each switch. The network manager selects the desired switches to install the feature on and also assembles the data to construct the qualification and action databases.

In accordance with the present invention the specific signaling Information Element (IE) is a new extra qualification/action IE which comprises the action pointer, i.e., an action ID, which may be represented by a 32 bit integer number. The action ID indicates which action is/will be taken by a network-element (NE). This extra qualification/action IE will be added by the network-element to inform the next hop network element about the action that have been taken, so it will not perform the same action again on the same call connection request.

As described above, the actual action and action ID is not crucial to the invention. The inclusion of an action itself is important to the invention. As discussed above, concerning the qualification function, the invention provides an action database (or table) in addition to the qualification function table. The index to the action table is the action ID or pointer. The action table used in each switch is preferably the same for all network elements within the network. The action table is constructed by a network management entity. Thus, each network element correlates the same action to similar action IDs and is able to access all the detailed information concerning the action by referencing only the action ID.

An example will now be presented to illustrate this optional feature of the invention. The additional specific Information Element is added to the connection request message generated by SVC originator A. Previously, switch #1, #2 and #3 have had their qualification and action databases configured by the network management station 78. For example, the qualification function for switch #1 may be to screen for connection requests whose destination address is B. Those ATM destination addresses meeting the criteria, have an associated action to steer all communications to destination C instead.

When the connection request message arrives at switch #1, the qualification function in the qualification function unit is scanned and a match results. The corresponding action causes the traffic to be steered to destination C instead of being forwarded to destination B.

Alternatively, the action could be to multicast the traffic to both destinations B and C. This multicast connection is indicated in FIG. 6 by the dashed line 80 going from switch #1 to switch #2, to switch #3 and to switch #4. After execution on switch #1, the connection request proceeds to switch #2. When it arrives, the same action, i.e., to steer to B and C, would otherwise be carried out. In accordance with the present invention, however, the duplicate action of steering the traffic to destination C is not repeated again, since this action was already performed on switch #1.

On switch #1, the action ID, of the action which was taken, is carried in a specific Information Element added to the connection request message that indicates to the next hop routed that an action has already been taken. The action can be indicated by an action number or equivalent identification means. This requires that the switches have knowledge of the possible actions on other switches. A standardized set of actions is preferably generated and distributed to the switches in the network.

In an alternative embodiment, one or more ordered actions may be associated with a qualification function. Ordered actions are combinations of actions that are to act upon a call connection in a specific order. The] It may be intended that the actions occur in a manner such that each action, in the ordered combination, is performed by a different network-element along the call path. The same qualification function configured on each network element, i.e., switch, can trigger a different action in each network element along the call path. A network element along the path will perform the action only if the previous hop network element informs the network element next along the path that a specific action was performed for that particular call. This indication can be communicated from node to node via the action Information Element. To accommodate this action IE, an additional parameter is added to the qualification function table. The additional parameter is termed the 'previous hop network element action ID.'

An illustrative example follows. Suppose there are four network elements along the path of a call from source A to destination B. The action database in the first network element is configured with an action to multicast the call to destination B in addition to destination C. The action database in the second network element is configured to multicast the call to destination D in addition to destination B. The action database in the third network element, however, is configured to block the call toward destination B.

In this example, the third network element should not block the call unless the previous network elements have successfully redirected the call. The previous hop network element action ID is used to indicate to the network elements whether or not a particular action was performed. If an action was not performed previously, then a suitable error message or reply can optionally be generated or the action simply is not performed at the third network element.

While the invention has been described with respect to a limited number of embodiments, it will be appreciated that many variations, modifications and other applications of the invention may be made.

What is claimed is:

1. A method of providing a signaling qualification function for connection requests in a connection oriented network, said method comprising the steps of:
    configuring a network element with a qualification database comprising one or more qualification functions;
    configuring the network element with an action database comprising one or more action functions;
    comprising said qualification functions in said qualification database against the contents of a call connection request message, each positive comparison generating a match;
    performing an action associated with the qualification function corresponding to each match generated; and
    providing an information element to be included with said connection request message sent to a next hog network element, said information element providing an indication of whether a particular action was performed for that particular connection.

2. The method according to claim 1, wherein said step of comparing comprises scanning each qualification function against qualification information associated with one or more information elements making up said connection request message.

3. The method according to claim 1, wherein said qualification function comprises an information element ID, a byte offset and a byte size of the information element information.

4. The method according to claim 1, wherein said qualification function comprises a qualification reference and a qualification operator.

5. The method according to claim 1, wherein said qualification function comprises a pointer to an action.

6. The method according to claim 1, wherein said qualification function comprises an action ID.

7. The method according to claim 1, wherein said qualification function comprises a priority indication.

8. The method according to claim 1, wherein said qualification function comprises a multilevel priority indication.

9. The method according to claim 1, wherein said step of configuring the network element with a qualification database is performed by a network manager via a network management station via a MIB using the SNMP protocol.

10. The method according to claim 1, wherein said step of configuring the network element with an action database is performed by a network manager via a network management station via a MIB using the SNMP protocol.

11. The method according to claim 1, wherein said qualification function comprises a previous hop network element action ID.

12. The method according to claim 1, further comprising the step of performing an ordered set of actions whereby the same qualification function triggers different actions on different network elements along the call path, wherein a network element performs its assigned action only if a previous hop network element indicates that its assigned action was performed.

13. An apparatus for providing a signal qualification function for connection requests in a connection oriented switch, comprising:
    a qualification database comprising one or more qualification functions;
    an action database comprising one or more action functions;
    a qualification function unit adapted to compare said qualification functions in said qualification database against the contents of a call connection request message, each positive comparison generating a match;
    an action function unit adapted to perform an action associated with the qualification function corresponding to each match generated; and
    means for providing an information element to be included with said connection request message sent to a next hop network element, said information element providing an indication of whether a particular action was performed for that particular connection.

14. A network switch for use in a connection oriented network, comprising:

an adaptation unit adapted to interface said switch to one or more physical connections;

a signaling unit for providing signaling functions between said switch and the rest of the network;

a qualification function unit comprising a qualification database for storing one or more qualification functions, said qualification function unit adapted to compare said qualification functions in said qualification database against the contents of a call connection request message, each positive comparison generating a match;

an action function unit comprising an action database for storing one or more action functions, said action function unit adapted to perform an action associated with the qualification function corresponding to each match generated;

a connection control unit adapted to provide services for the establishment and termination of calls; and means for providing an information element to be included with said connection request message sent to a next hop network element, said information element providing an indication of whether a particular action was performed for that particular connection.

15. The network switch according to claim 14, wherein the contents of said qualification database and said action database are provided by a network management station.

16. The network switch according to claim 14, wherein said action function unit comprises a priority processor adapted to analyze actions and their associated priorities input thereto and to determine an appropriate order in which actions are to be executed.

17. The network switch according to claim 14, further comprising means for performing an ordered set of actions whereby the same qualification function triggers different actions on different network elements along the call path, wherein a network switch performs its assigned action only if a previous hop network element indicates that its assigned action was performed.

18. The network switch according to claim 14, wherein said qualification function unit comprises means for detecting specific information within an information element and to forward an indication to said action function unit in response thereto.

* * * * *